United States Patent [19]
Dekoekkoek

[11] 3,799,318
[45] Mar. 26, 1974

[54] CONVEYOR LOADING APPARATUS
[75] Inventor: John W. Dekoekkoek, Seattle, Wash.
[73] Assignee: Western Automation Corporation, Redmond, Wash.
[22] Filed: Oct. 4, 1971
[21] Appl. No.: 186,171

[52] U.S. Cl. .................................. 198/26, 198/38
[51] Int. Cl. .............................................. B65g 47/00
[58] Field of Search ...... 221/192, 254, 268; 198/38, 198/26, 43, 46

[56] References Cited
UNITED STATES PATENTS
1,268,212   6/1918   Burget ............................... 221/192

FOREIGN PATENTS OR APPLICATIONS
1,520,468   3/1968   France ................................. 198/38
74,387      4/1894   Germany ............................. 198/26

OTHER PUBLICATIONS
"Escapements for Automatic Parts Handling," John Kay, Automation, Mar. 1966, pp. 83–88.

Primary Examiner—Richard E. Aegerter
Assistant Examiner—Joseph E. Valenza
Attorney, Agent, or Firm—Graybeal, Barnard, Uhlir & Hughes

[57] ABSTRACT

Apparatus for loading hanger type article supports onto a conveyor, and particularly, apparatus for loading hangered garments onto a conveyor of the type including a plurality of spaced hanger support members extending from an endless chain or the like. The apparatus includes: an elongate arm positioned adjacent the conveyor on an angle such that hangered garments placed thereon tend to slide toward the conveyor; a retaining block on the arm preventing the hangered garments from sliding thereby; and, a lifting finger raising individual hangered garments past the retaining block in response to a signal from a switch adjacent the conveyor upstream from the elongate arm which is actuated by the hanger support member to be loaded. A hanger release arm is positioned transverse the conveyor adjacent the elongate arm to hold individual hangered garments on the arm until the hanger support member to be loaded pivots it away from the arm such that the hangered garment slides onto the hanger support members.

8 Claims, 4 Drawing Figures

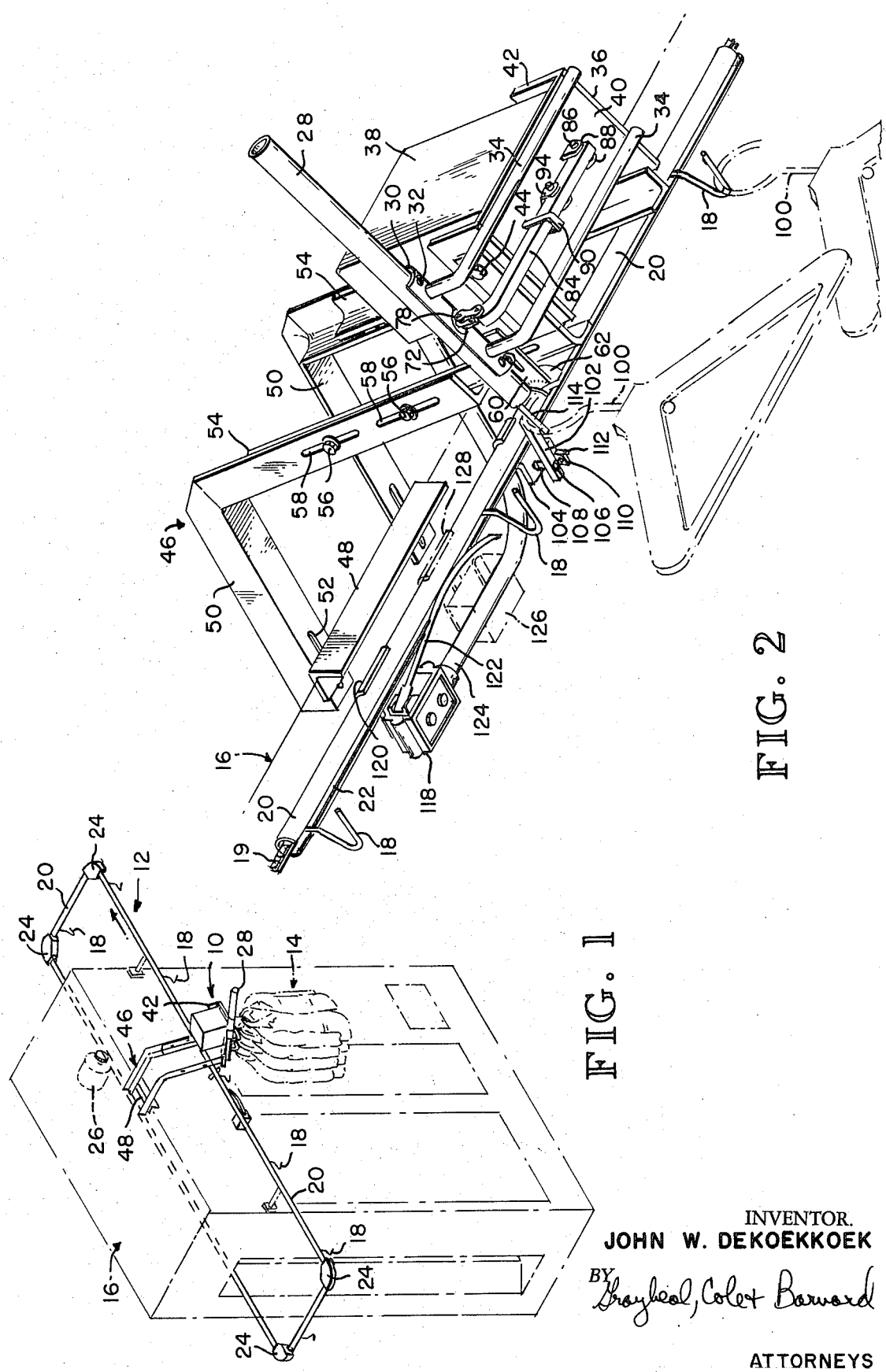

INVENTOR
JOHN W. DEKOEKKOEK
BY Greybeal, Cole & Barnard
ATTORNEYS

CONVEYOR LOADING APPARATUS

BACKGROUND OF THE INVENTION

1. FIELD OF THE INVENTION

This invention relates to apparatus for automatically loading a conveyor, and more particularly, to apparatus for loading individual hangers and their loads onto a continuously moving conveyor having hanger support hooks extending therefrom.

2. DESCRIPTION OF THE PRIOR ART

The use of conveyor systems to move and store large numbers of articles supported on hangers has long been known. In particular the clothing industries have long mounted hangered garments on endless conveyors for storage and rapid retrieval, as well as for convenient handling during dewrinkling, cleaning or the like. One known type of conveyor includes a plurality of longitudinally spaced hanger support members extending therefrom on which the hangered garments to be transported are carried. Automatic loading apparatus for conveyors, such as those disclosed in U.S. Pat. Nos. 2,868,354, 2,916,132 and 2,918,164 are known. These patents relate to apparatus for loading articles other than hangered garments onto conveyors, and disclose systems substantially different from that disclosed herein. The particular problems involved in moving and handling hangered garments which arise, inter alia, from the smallness of the cross-section of the hanger hook and the tendencies of hanger hooks to bunch together and overlap and to twist during transport such that the hanger hook changes orientation with respect to its support have generally prevented the successful application of automatic loading techniques to the placement of hangered garments on conveyors having spaced hanger support members and thus hangered garments have, in the past, usually been loaded on this type conveyor by hand. U.S. Pat. No. 2,947,407 discloses hangered garment conveyor loading apparatus wherein a plurality of uniformly spaced apart palls are positioned to extend outwardly through slots in a pipe on which a plurality of hangers are spacedly mounted. The palls are movable longitudinally with respect to the pipe to engage the hangers and move them longitudinally on the pipe to a point where they move onto a conveyor of the continuous track type.

BRIEF SUMMARY OF THE INVENTION

The present invention provides automatic apparatus for loading hangered garments on a conveyor of the type having individual longitudinally spaced hanger supports extending from a continuous chain or the like. In one form, the invention includes a sloping arm positioned adjacent the conveyor such that hangered garments placed thereon tend to slide toward the conveyor. A wedge-shaped stop member is positioned on the top portion of the arm to stop the sliding movement of the hangered garments, while a reciprocating lifting finger is mounted within the arm, adjacent the face of the wedge, to lift an individual hangered garment such that it slides down the back of the wedge toward the conveyor. In one form of the instant invention the hangered garment slides directly onto the conveyor, while in the preferred form a pivotally mounted arm adjacent the conveyor again interrupts the sliding movement of the hangered garment and holds it on the sloping arm. The lifting action of the finger is triggered by a sensing device mounted adjacent the conveyor upstream from the elongate arm which senses the movement thereby of the hangered garment support to be loaded. As the hangered garment support moves past the elongate arm it contacts the pivotally mounted arm and moves it such that the restraint on the hangered garment is removed whereupon it slides onto the hanger support.

In another form, the sensing means mounted upstream on the arm is of the type wherein the lifting finger is actuated by every second support member on the conveyor such that alternate hangered garment support members are loaded. In still other forms, suitable upstream sensing means may be provided to control the actuation of a plurality of automatic conveyor loaders positioned to load a single conveyor.

It is an object of the present invention, therefore, to provide simple and efficient apparatus for automatically loading articles supported on hangers onto a conveyor.

Another object of the present invention is to provide apparatus for loading hangered garments onto a conveyor of the type including longitudinally spaced hanger supports.

One more object is to provide simple, efficient and reliable apparatus capable of automatically loading an individual hangered garment onto an individual hangered garment support on a continuously moving conveyor.

An additional object is to provide apparatus including a lifting finger having a curvilinear top portion capable of segregating an individual hangered garment from a plurality of hangered garments mounted on an elongate arm.

Other and additional objects and advantages of the present invention will be apparent from the following description taken in conjunction with the accompanying drawings.

BRIEF DESCRIPTION OF THE DRAWINGS

FIG. 1 is a perspective view of a conveyor loading apparatus, typifying the instant invention, mounted to load an endless chain type conveyor feeding garment treating apparatus.

FIG. 2 is a perspective view of the conveyor loading apparatus of FIG. 1, including a portion of the conveyor to be loaded, and an alternate form of actuating switch shown in dotted line.

DETAILED DESCRIPTION OF THE INVENTION

Figure 3:
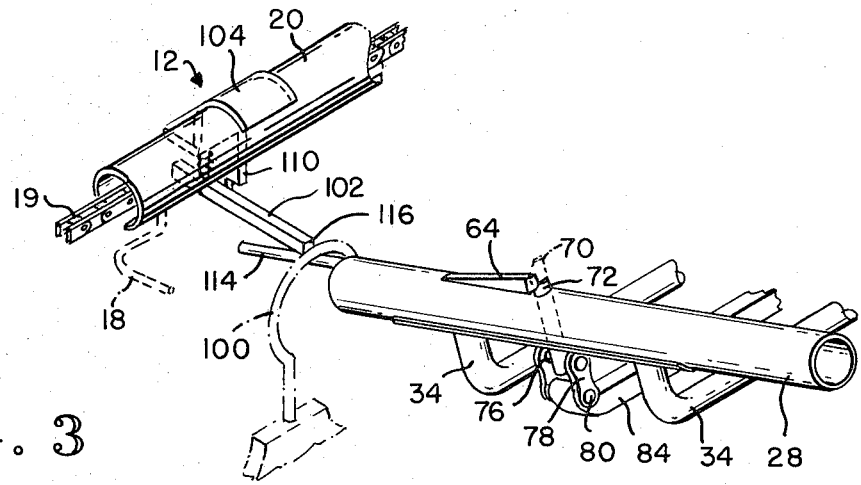
FIG. 3 is a partial perspective view of the instant invention including the hook of a hanger retained by a pivotally mounted arm adjacent the conveyor.

Referring initially to FIG. 1, an automatic conveyor loading apparatus 10, typifying the instant invention is shown mounted to load a conveyor 12 carrying hangered garments 14 through garment treating apparatus 16. As illustrated, apparatus 16 represents a stream treating and vibrating machine of the type disclosed in U.S. Pat. No. 2,911,729, it being understood that the automatic conveyor loading apparatus disclosed herein may be used with conveyor systems of varying design, conveying hangered garments for differing purposes and in conjunction with a wide variety of equipments. The instant conveyor loading apparatus is particularly suited to successfully perform the relatively exact operation of loading hangered garments on individual support hooks, such as hooks 18 extending from conveyor apparatus 12.

Referring additionally to FIGS. 2 and 3, conveyor system 12 is seen to include an endless chain 19 of the roller link type traveling within tubular support track 20 which includes a longitudinally extending slot 22 in the bottom portion thereof. Chain 19 is driven by conventional drive motor 26 around cooperating sprockets mounted in corner supports 24. The conveyor system disclosed herein forms no part of the instant invention and other conveyor systems having support hooks of differing configuration suitable for carrying hangered articles may be automatically loaded by the apparatus of the instant invention.

Automatic conveyor loading apparatus 10 includes an elongate arm 28 mounted to extend outwardly and upwardly from a point adjacent conveyor system 12. As illustrated, arm 28 comprises a hollow pipe section, but it will be understood that differing materials suitable for supporting hangered garments, or the like, may be substituted therefor. Elongate arm 28 is supported on similarly contoured channel member 30 and connected thereto by conventional fasteners such a bolts 32. Channel member 30 includes a central hole portion 31 through which the hangered garment lifting finger to be described hereafter extends. Channel member 30 is in turn mounted on support arms 34 which extend outwardly and upwardly from welded connections with support platform 36 for circuit box 38 of the instant invention. Circuit box support platform 36 includes a bottom plate member 40 and transverse side members 42 which are connected by conventional fasteners such as bolts 44 to the principal support frame of the instant apparatus identified generally by the numeral 46.

Support frame 46 is constructed from a plurality of adjustably interconnected metal pieces of right angle cross section, and is mounted to extend between the cabinet of the garment processing apparatus 16 and the tubular conveyor chain support rod 20. In particular, support frame 46 is shown to include a plate 48 mounted on cabinet 16 to which outwardly extending members 50 are adjustably connected by conventional fastening means extending through slots 52. Cooperating extension members 54 include cross sections adapted to mate with the cross sections of members 50 and are adjustably connected thereto by conventional nut and bolt fasteners 56 which extend through slots 58. Members 54 are adjustably connected in like manner near their outer end to transverse support rods 60 which include curved bottom portions 62 which rest on conveyor chain support tube 20 and may be welded thereto if necessary. It will, of course, be understood that the support system for the conveyor loading apparatus of the instant invention may be of varied construction and configuration and may be mounted in a variety of manners to hold the conveyor loading apparatus 10 generally adjacent the conveyor to be loaded.

Figure 4:
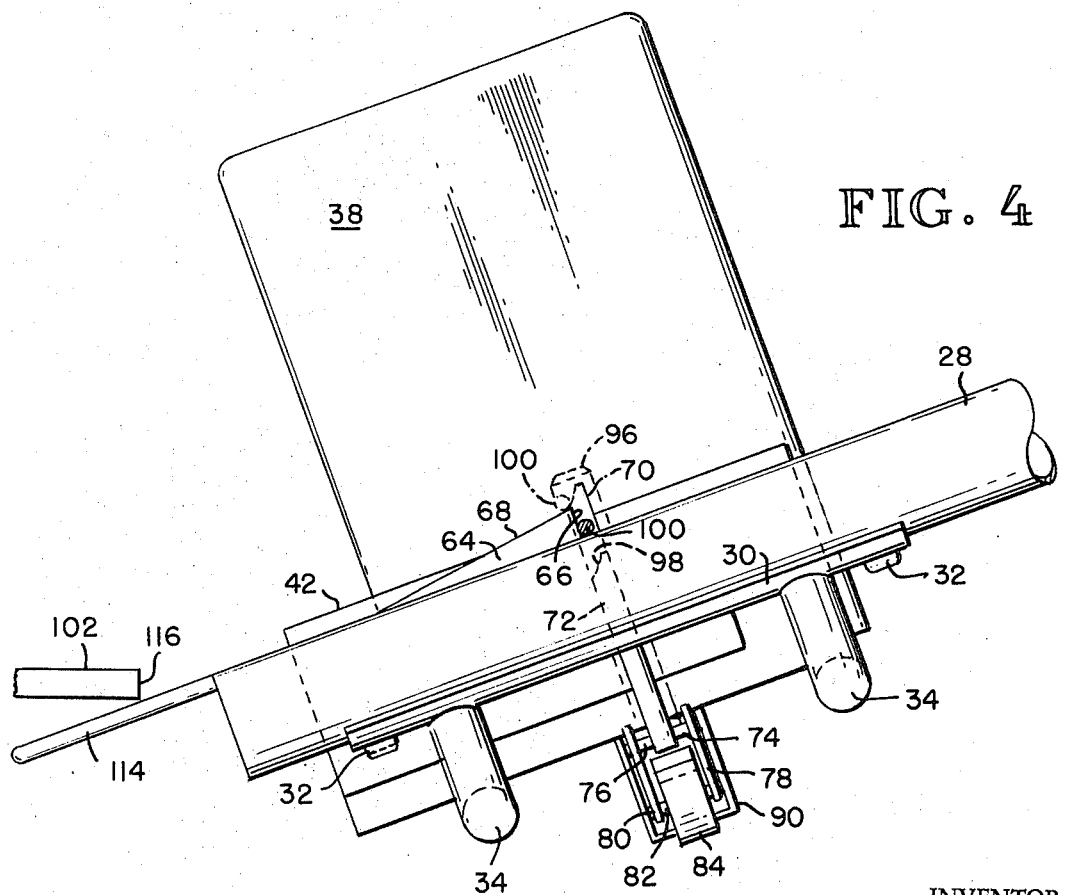
FIG. 4 is a partial elevation view of the conveyor loading apparatus of the instant invention.

Referring particularly to FIGS. 3 and 4, the detailed construction of the hangered garment storage and feeding portion of a typical conveyor loading apparatus made according to the instant invention is illustrated. Elongate arm 28 includes a wedge-shaped hangered garment stop 64 mounted on its top portion to interrupt the sliding of hangered garments delivered to sloping arm 28 toward the conveyor 12. Wedge-shaped member 64 includes a hanger stop face portion 66 extending generally perpendicular to the surface of arm 28 and a sloping back portion 68.

Adjacent face portion 66 of the wedge-shaped stop, a finger member 70 is mounted for reciprocal motion in hole 72 which extends through arm 28. Finger 70 includes a hole 74 near its lower end through which one pin 76 of a link connector 78 extends. The opposite pin 80 of the chain link connector extends through a hole 82 in the end portion of rocker arm 84.

As is best seen in FIG. 2, rocker arm 84 is pivotally mounted near its end distal pin 72 by means of conventional pin fastener 86 which extends through aligned holes in the rocker arm and in a pair of laterally spaced ears 88 extending outwardly from base plate 40. Rocker arm 84 extends through collar 90 which is adapted to maintain the lateral alignment of the rocker arm and is additionally connected by means of link connector 94 to solenoid actuated reciprocating rod 96 mounted within casing 38. Rod 96 is driven in and out of casing 38 by a conventional solenoid drive mechanism in response to an electrical signal from a source to be described hereafter. It will be understood that rod 96 may also be satisfactorily driven by hydraulic or air operated cylinders, and such modifications are considered to be within the scope of this invention. The upward movement of rod 96 pivots rocker arm 84 upwardly about pin connection 86 to raise finger 70 mounted on its opposite end upwardly out of hole 72 in arm 28. As will be readily understood, link connectors 78 and 94 provide the flexibility necessary to allow finger 70 and drive rod 90 to move in straight lines without binding within arm 28 and casing 38 respectively while being driven by end mounted rocker arm 34. During its upward travel, finger 70 lifts an individual hangered garment held from sliding by wedge face 66 upwardly onto the sloping back 68 of the wedge. As is best seen in FIG. 4, pin 70 includes a curved top portion 98 which is adapted to first separate the hook of the hanger 100 adjacent wedge face 66 from the hooks of the other hangered garments stored on arm 28 and then lift the hanger 100 upwardly along wedge face 66 until it slides onto the sloping back 69 of the wedge, as shown in dotted line. Once deposited on the sloping back of the wedge stop, the hanger resumes its sliding movement toward the conveyor. In one form of the instant invention wherein the electrical signal actuating finger 70 is responsive to vacant hangered garment carrying positions on the conveyor, the hangered garment may move directly onto the conveyor or onto a support hook on the conveyor. In another form wherein the electrical signal is delivered in response to movement of the conveyor, or more particularly, to movement of a hangered garment support hook on the conveyor, the movement of the hangered garment toward the conveyor is stopped by a hanger release arm 102.

As is best seen in FIGS. 2 and 3, hanger release arm 102 is mounted for pivotal movement on pin 106 extending through release arm 102 and through a cooperating hole in bracket 104 on conveyor chain support tube 20. Helical spring 108 is mounted on pin 106 and is connected between arm 102 and bracket 104 to bias the hanger release arm to rotate toward the oncoming hanger supports 18. Stop member 110 which includes adjustable screw 112 extending therethrough, is mounted on support bracket 104 to prevent hanger release arm 102 from rotating past a position generally transverse the conveyor. Elongate arm 28 is provided with an end mounted small diameter extension finger 114 extending longitudinally toward the conveyor. Adjustment of retaining screw 112 within stop member 110 allows the end 116 of hanger release arm 102 to be positioned immediately adjacent finger 114 such that a hanger 100 is held thereby (FIGS. 2 and 3). As the hanger support hook 18 on the conveyor chain moves past elongate arm 28, it contacts hanger release arm 102 which extends transversely across the conveyor path and pivots the release arm about pin 106 and against spring 108, such that the hanger 100 held on finger 114 is released and slides onto the support hook 18 as it passes the end of finger 114. The hanger support hook 18 continues to pivot arm 102 through approximately 90° until it passes the end of the arm 116 whereupon spring 108 returns the hanger release arm to its hangered garment holding position adjacent the finger 114. It will be understood that hanger release arm 102 may be positioned adjacent the conveyor in a manner other than that disclosed and still maintain the principle of operation whereby the conveyor hook to be loaded releases a hangered garment held on the elongate support arm as it moves thereby.

Referring particularly to FIG. 2, the means transmitting the actuating signal to the solenoid which lifts rod 96 into casing 38 to pivot the rocker arm 84 is shown to comprise a conventional microswitch unit 118 mounted by means of bracket 120 on the conveyor chain support 20 upstream from the conveyor loading apparatus. Microswitch 118 is provided with an elongate contact arm 122 which extends toward the conveyor such that it is contacted by hanger support hooks 18 as they pass toward the conveyor loading apparatus 10. Obvious variants of microswitch 118 suitable for sensing the passing of a conveyor support hook and transmitting an impulse to actuate the solenoid which drives rod 96, such as a photo-electric cell, are, of course, considered to be within the scope of this invention.

In operation of one form of the invention, hanger support hook 18 pivots arm 122 as it passes thereby switching microswitch 118 and causing an impulse to be sent through conduit 124 to the solenoid actuator in casing 38 whereby rod 96 is moved upwardly into the casing such that rocker arm 84 raises finger 70 out of the hole 72 in elongate arm 28 to lift an individual hanger 100 up wedge face 66 to a point where it slides onto the sloping back 68 of the wedge. The cant of arm 28 and wedge 64 causes the individual hangered garment to slide toward the conveyor until its movement is arrested by contact with the end 116 of pivotally mounted arm 102. Microswitch 118 is mounted on conveyor chain support 20 upstream from the conveyor loading apparatus a distance such that the travel time of hanger support hook 18 from its contact with microswitch arm 122 to its contact with pivotal hanger release arm 102 is at least slightly greater than the time necessary to move the hangered garment to be loaded from adjacent the wedge face into contact with the end of hanger release arm 102, and consequently, during proper operation, the hangered garment to be loaded is stopped, at least instantaneously, by the hanger release arm prior to the initial pivoting of the release arm by the hanger support hook 18. As described heretofore, as the hangered garment support hook pivots arm 102 the hangered garment to be loaded slides down finger 114 onto the conveyor hook. Continued movement of the loaded conveyor hook along its path of travel eventually releases the arm 102 allowing it to spring back to its position adjacent finger 114 whereupon the conveyor loading apparatus is ready to be reactuated by a conveyor hook passing the upstream microswitch.

FIG. 2 illustrates in dotted line, an alternate embodiment of the instant invention wherein every second conveyor hook 18 is loaded, including a conventional alternate action type switch 126 mounted by means of bracket 128 on the conveyor chain support 20 at a point such that the movement of arm 122 by hanger support hook 18 switches the alternate action switch. As is known, alternate action switches require double actuation to be switched and thus the passing of two conveyor hooks is necessary to cause switch 126 to send an impulse through conduit 124 to actuate the solenoid which reciprocates rod 96. This embodiment is particularly useful when two of the instant conveyor loading apparatuses are positioned to load the hooks of a single conveyor. It will be understood that the use of appropriate upstream sensing means, such as a plurality of rotary switches providing a wide variety of action-no action combinations, allows a plurality of conveyor loading apparatuses to be used to load the hooks of a single conveyor.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. Apparatus for loading hanger means on a conveyor including:
   a continuous conveyor;
   hanger support hooks mounted on said conveyor at longitudinal intervals therealong and extending downwardly therefrom;
   an elongate arm having a hanger delivery end adjacent the conveyor and a hanger storage end distal said hanger delivery end;
   hanger means mounted on said elongate arm at said storage end;
   said elongate arm canted such that the hanger means positioned thereon tend to move from said storage end toward said delivery end;
   stop means restraining movement toward said delivery end of said hanger means on said elongate arm;
   finger means lifting individual hanger means past said stop means such that said hanger means resume movement toward said delivery end;
   hanger release arm means pivotally mounted adjacent said conveyor such that a portion thereof lies in the path of said hanger support hooks on said conveyor;
   said hanger release arm means having a first hold position extending outwardly from said conveyor to a location adjacent the delivery end of said elongate arm to engage and hold a hanger means on the delivery end thereof; and, said hanger release arm means being pivotally movable in response to contact by a hanger support hook to a second release position away from said elongate arm to release the hanger means on said elongate arm such that said hanger means moves onto and loads said hanger support hook.

2. The apparatus of claim 1 wherein said stop means is mounted on the top portion of said elongate arm and includes an upstanding face portion on its end adjacent the storage end of said elongate arm and a sloping back portion adjacent the delivery end of said elongate arm such that hanger means lifted thereon slide toward said delivery end of said elongate arm means; and, said finger means includes a curvilinear top portion and is mounted in said elongate arm adjacent the upstanding face of said stop means and movable upwardly with respect to said upstanding face to lift an individual hanger means such that said hanger means slides from said curvilinear top portion down the sloping back of said stop means toward said conveyor.

3. The apparatus of claim 1 including sensing means positioned adjacent said conveyor upstream from said loading apparatus, said sensing means adapted to sense the passing of a hanger support hook and actuate means lifting said finger means to move an individual hanger past said stop means.

4. The apparatus of claim 3 wherein said sensing means senses the load or no load condition of a hanger support hook conveyed thereby and actuates said finger means on said elongate arm means only in response to the passage of an unloaded hanger support hook.

5. The apparatus of claim 3 wherein said sensing means includes microswitch means adjacent said conveyor upstream from said elongate arm, and wherein said finger means is raised by solenoid means actuated by said microswitch means to advance individual hangered garments past said stop means.

6. Apparatus for loading hangered garments including:
a conveyor having a plurality of hangered garment support members extending downwardly from a continuous flexible member;
an elongate arm positioned adjacent said conveyor and extending upward therefrom such that hangered garments loaded on said arm gravitate toward said conveyor;
a stop member mounted on said elongate arm preventing hangered garments from moving thereby;
finger means adapted to lift individual hangered garments past said stop member;
sensing means adjacent said conveyor upstream from said elongate arm sensing the movement of a hangered garment support member thereby and adapted to actuate said fingers means;
hanger release arm means pivotally mounted adjacent said conveyor such that a portion thereof lies in the path of movement of said hangered garments support members;
said hanger release arm means having a first hold position wherein said arm means extends outwardly from said conveyor to a location adjacent said elongate arm to engage and hold a hangered garment thereon; and,
said hanger release arm means being pivotally movable in response to contact by a hangered garment support member to a second release position away from said elongate arm whereby said hangered garment is released to slide onto and load the hangered garment support hook.

7. The apparatus of claim 6 wherein said sensing means includes means actuated by the passing of more than one hangered garment support member such that said finger means is actuated to lift an individual hangered garment past said stop member to load less than all of the hangered garment support members passing thereby.

8. The apparatus of claim 6 wherein said sensing means senses the load or no load condition of the hangered garment support member passing thereby and actuates said finger means only in response to the sensing of an unloaded hangered garment support means.

* * * * *